United States Patent
Zhang et al.

(10) Patent No.: US 11,422,797 B1
(45) Date of Patent: Aug. 23, 2022

(54) USING GRAPH PARTITIONING FOR SOFTWARE DECOMPOSITION DURING MODERNIZATION PROCESSES

(71) Applicant: Amazon Technologies, Inc., Seattle, WA (US)

(72) Inventors: Jiangtao Zhang, Pleasanton, CA (US); Roland Mesde, Cupertino, CA (US); Vivek Chawda, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/109,359

(22) Filed: Dec. 2, 2020

(51) Int. Cl.
*G06F 8/70* (2018.01)
*G06F 8/72* (2018.01)
*G06F 8/71* (2018.01)
*G06F 8/77* (2018.01)
*G06F 8/75* (2018.01)

(52) U.S. Cl.
CPC .................. *G06F 8/72* (2013.01); *G06F 8/71* (2013.01); *G06F 8/75* (2013.01); *G06F 8/77* (2013.01)

(58) Field of Classification Search
USPC .......................................................... 717/123
See application file for complete search history.

(56) References Cited

U.S. PATENT DOCUMENTS

| 2012/0137240 | A1* | 5/2012 | Krueger | .................... G06F 8/75 |
| | | | | 715/771 |
| 2012/0265507 | A1* | 10/2012 | Carbajales | ................ G06F 8/35 |
| | | | | 703/6 |
| 2017/0097820 | A1 | 4/2017 | Lategan | |
| 2019/0253485 | A1* | 8/2019 | Jyoti Banerjee | .... H04L 67/1097 |

OTHER PUBLICATIONS

Non-Final Office Action, U.S. Appl. No. 17/037,075, dated Sep. 21, 2021, 8 pages.
Chen, R. et al., "From Monolith to Microservices: A Dataflow-Driven Approach," 2017 24th Asia-Pacific Software Engineering Conference (APSEC), 2017, pp. 466-475.
(Continued)

*Primary Examiner* — John Q Chavis
(74) *Attorney, Agent, or Firm* — Nicholson De Vos Webster & Elliott LLP

(57) ABSTRACT

Techniques are described for using graph partitioning techniques to identify refactoring candidates to decompose monolithic software applications as part of software modernization processes. An application modernization system constructs a graph model of a software application based on an analysis of application artifacts associated with the software application. The graph model includes nodes each representing an independent application component and further includes edges representing identified dependency relationships among the application components. An application modernization system further generates application profile metrics associated with the identified dependencies, and weights derived from such metrics are applied to the edges of the graph model. Once a weighted graph model is obtained, a graph partitioning algorithm is applied to identify a plurality of subgraphs each representing a candidate subunit of the application for refactoring.

20 Claims, 9 Drawing Sheets

(56) References Cited

OTHER PUBLICATIONS

Gulati, V. et al., "Introducing IBM Mono2Micro," IBM Cloud Blog, May 6, 2020, https://web.archive.org/web/20201109163249/https://www.IBM.com/cloud/blog/announcements/IBM-mono2micro, 7 pages.

Patel, C. et al., "Software Clustering Using Dynamic Analysis and Static Dependencies," Thesis M. Comp. Sc. Concordia University, Aug. 2008, 103 pages.

Xiao, C. et al., "Software Clustering Based on Dynamic Dependencies," Ninth European Conference on Software Maintenance and Reengineering, 2005, pp. 124-133.

* cited by examiner

US 11,422,797 B1

USING GRAPH PARTITIONING FOR SOFTWARE DECOMPOSITION DURING MODERNIZATION PROCESSES

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
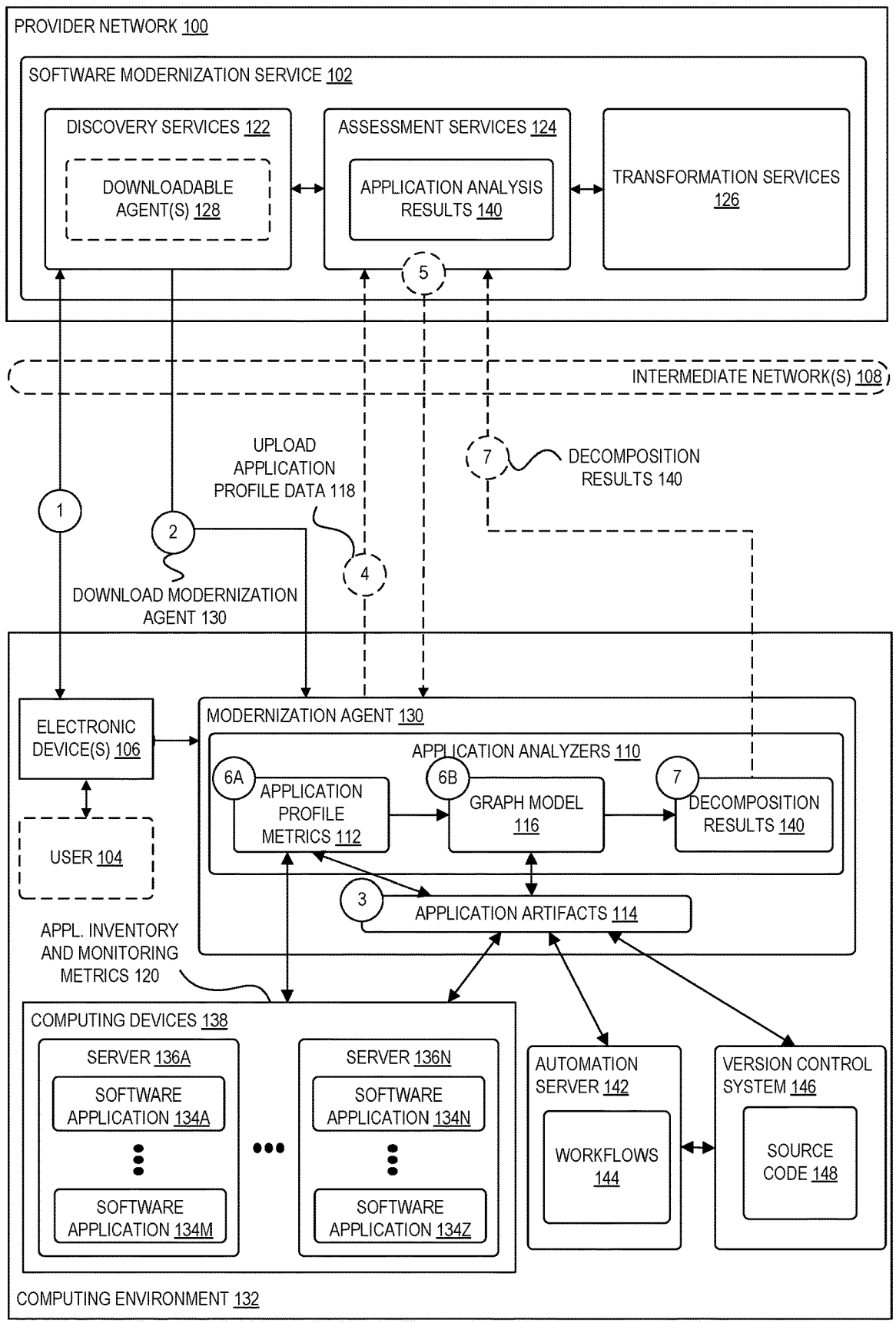
FIG. 1 is a diagram illustrating an environment for using graph partitioning techniques to identify refactoring candidates used to decompose monolithic software applications as part of software modernization processes according to some embodiments.

The present disclosure relates to methods, apparatus, systems, and non-transitory computer-readable storage media for using graph partitioning techniques to identify refactoring candidates to decompose monolithic software applications as part of software modernization processes. According to some embodiments, an application modernization system constructs a graph model of a software application based on an analysis of application artifacts (e.g., source code, bytecode, intermediate code representations, etc.) associated with the software application. The graph model, for example, may include nodes or vertices each representing an independent abstraction or application component (e.g., a package, a file, a class, a method, a data object, etc.) and further include edges representing identified dependency relationships among the application components. In some embodiments, an application modernization system further generates various application profile metrics associated with the identified dependencies (e.g., runtime profile metrics, pointer analysis metrics, etc.), and weights derived from such metrics are applied to the edges of the graph model. In this context, such weights may generally represent an expected cost to decompose a software application along particular boundaries identified by the graph model. Once a weighted graph model is obtained, in some embodiments, a graph partitioning algorithm is applied to identify a plurality of subgraphs each representing a candidate subunit of the application for refactoring. Among other benefits, the software application graph generation and partitioning techniques described herein enable more efficient identification and prioritization of application refactoring candidates for decomposing monolithic software applications into modernized architectures, thereby improving the performance, scalability, and general operation of such applications.

Software modernization broadly refers to converting, rewriting, or porting legacy software applications or systems to more modern computer programming languages, software libraries, protocols, hardware platforms, application architectures, cloud-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

In some cases, modernizing a software application involves refactoring a monolithic software application into smaller subunits, where each subunit includes an independent code base that can be independently maintained and deployed. The decomposition of a monolithic software application into such subunits can be associated with a host of benefits ranging from an improved ability to test and debug smaller units of code, an ability to independently scale various components of the application as needed, and so forth. However, identifying candidate subunits of an application for such refactoring processes presents a number of challenges. For example, the complex interworking nature of software applications and numerous considerations involved when selecting where application subunit boundaries lie often renders the process of identifying application subunits an intractable problem for software developers desiring to modernize a software application. Furthermore, certain considerations for decomposing a software application may have a priority for some software developers and applications over others.

The aforementioned challenges, among others, are addressed by an application modernization system that is capable of automatically identifying software application subunits for refactoring and other modernization tasks. As indicated, in some embodiments, the processes described herein include generating a graph model of a software application and weighting the graph model based on a variety of application profiling metrics, where the metrics may generally provide an indication of an expected cost associated with decomposing an application along particular application boundaries. The metrics can be further associated with user-customizable metric weights reflecting a prioritization of the various metrics compared to others when a user is considering a refactoring strategy. In some embodiments, a graph partitioning algorithm can then be used to identify proposed application subunits and to recommend a decomposition strategy based on the input factors.

FIG. 1 is a diagram illustrating an environment that enables a software modernization service 102 of a cloud provider network 100 to use graph partitioning techniques to identify refactoring candidates used to decompose monolithic software applications, e.g., as part of modernization processes aimed at migrating users' applications to a cloud service provider's infrastructure. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") (e.g., a user 104) of provider networks 100 may utilize one or more user accounts that are associated with a customer account, though these terms may be used somewhat interchangeably depending upon the context of use. Users may interact with a provider network 100 via an electronic device (e.g., electronic device(s) 106) across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, a cloud provider network 100 includes a hardware virtualization service. The hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, a cloud provider network 100 includes a container service. The container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, a software modernization service 102 provides various types of software modernization services and functionality, including discovery services 122, assessment services 124, and transformation services 126, which are collectively aimed at helping users to discover and use recommended modernization and migration paths for their software applications. The discovery services 122, for example, provides various services, software applications, software agents, and other tools (e.g., including downloadable modernization agents 130) used to identify software applications in users' computing environments and to collect profile information for software applications undergoing modernization processes. The assessment services 124 generally enable users and applications to obtain various types of software modernization assessments and recommendations, e.g., based on analyses of application artifacts (e.g., source code and bytecode) collected for users' applications by the discovery services 122 and associated tools. For example, the recommendations generated by an assessment service 124 can include recommended modernization strategies, recommended modernization tools, estimated modernization costs, etc. In some embodiments, transformation services 126 generally include various services, applications, and other tools used to perform modernization actions and migrations, e.g., based on modernization recommendations generated by assessment services 124.

According to embodiments described herein, a software modernization system can be used to generate proposed decompositions of monolithic software applications undergoing modernization processes. For example, in some embodiments, a modernization agent 130 includes one or more application analyzers 110 configured to statically and dynamically analyze application artifacts (e.g., application artifacts 114 including source code, bytecode, or other associated artifacts) obtained for software applications undergoing analysis (e.g., any of software applications 134A-134Z running on servers 136A-136N or computing devices 138). In some embodiments, the source code or bytecode files may be obtained from a version control system 146, automation server 142, or other storage locations within or external to a user's computing environment 132.

In some embodiments, based on various types of analyses performed, the application analyzer(s) 110 generate application profiling metrics 112 and graph models 116 representing dependency relationships among application components (e.g., packages, files, classes, methods, variables, etc.), among other possible information including detected anti-patterns and the like. According to embodiments, the generation of such graph models 116 further involves applying weights derived from generated application profiling metrics 112 to the edges of the graph model 116 to obtain weighted graph models. As indicated, these weights can be representative of a cost to decouple a monolithic application at various identified dependency points. In some embodiments, the weighted graph model can then be used to generate decomposition results 140 used to recommend to a user a proposed decomposition strategy that can be used a guide to modernize the application undergoing analysis. For example, the decomposition results 140 can include a number of distinct microservices broken out from the application.

In FIG. 1, the circles labeled "1"-"8" illustrate an example process in which a user obtains a modernization agent 130 used to inventory and analyze software applications in the user's computing environment including, e.g., processes related to decomposing a monolithic software application into subcomponents (sometimes also referred to as subunits or microunits). Each subunit represents a defined subset of a software application's source code that, with some amount of refactoring, can be implemented as an independently developed, buildable, and deployable software application unit. For example, in a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples.

In some embodiments, at circle "1" in FIG. 1, a user accesses the software modernization service 102 (for example, via various interfaces provided by discovery services 122) to obtain information about available modernization services and tools and to download one or more downloadable agents 128. In some embodiments, at circle "2," one or more particular modernization agents 130 are downloaded and installed on servers within a user's on-premises computing environment 134 (e.g., on a physical server or VM). In some embodiments, users (e.g., a user 104) can use a computing device 106 to interact with the modernization agent 130 via a command line interface (CLI), graphical user interface (GUI), or any other type of interface provided by the modernization agent 130.

For example, at the circle labeled "2" in FIG. 1, a user 104 has obtained and installed the modernization agent 130, including the application analyzer(s) 110, on a computing device within the user's computing environment 132 (e.g., at an on-premises datacenter or other type of user computing environment) to assist with modernizing one or more software applications 134A-134Z running in the user's computing environment 132. The software applications 134A-134Z, for example, may include one or more applications deployed on one or more Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some embodiments, at circle "3," a user invokes an inventory command provided by an modernization agent 130 and used to identify applications within the user's computing environment 132 that can be assessed (e.g., including some or all of software applications 134A-134Z in the example of FIG. 1) and, optionally, to perform various preliminary analyses of the identified applications. In some embodiments, instead of interacting directly with the modernization agent 130, the user 104 may instead interact with a web-based console or other interface provided by the software modernization service 102. The software modernization service 102 may then in turn instruct a modernization agent 130 or other application running in the user computing environment 132 to perform some or all of the application inventory and monitoring metrics 120 collection operations described in reference to FIG. 1 such as, for example, identifying an inventory of applications, obtaining application artifacts 114 for the applications (e.g., including source code or binary executable file information identifying JAR files, DLL files, process identifiers, etc.), among other possible types of application profile information described herein.

In some embodiments, a modernization agent 130 collects dynamic runtime information about discovered software applications including, e.g., process identifiers, runtime artifacts such as binary executables, JAR files, DLL files, etc. A modernization agent 130 can further collect source code 148, for example, stored in a version control system 146 or other storage location within the user's computing environment 132 or elsewhere. In some embodiments, a user provides a modernization agent 130, software modernization service 102, or both, with authentication information (e.g., a username and password, security token, etc.) that can be used to access the version control system based on a URL or other access identifier.

In some embodiments, a user 104 may further configure the modernization agent 130 with the ability to access an automation server 142 in the user's computing environment, the provider network 100, or elsewhere, e.g., to collect bytecode files or other types of application artifacts. In some embodiments, the automation server 142 broadly represents any type of server, service, application, or other tool that helps automate various software development processes such as, for example, building, testing, and deploying software applications. An automation server 142, for example, may automate such processes in an effort to facilitate a continuous integration and continuous delivery approach to software development and deployment. In some embodiments, the automation server 142 is a server-based system that interfaces with version control tools (e.g., a version control system 146) to identify changes to a repository (e.g., code commits) or other events and may further include configurations used to automate one or more actions responsive to the detection of such events. In some embodiments, users can use an automation server 142 to configure any number of workflows 144 (sometimes also referred to as "jobs," "pipelines," or "projects"), each representing a defined configuration of automated processes for building, testing, and/or deploying software applications (e.g., illustrated by stored workflows 148A-148N). In this example, each workflow may be associated with a configuration file or other data that defines various actions, parameters (e.g., locations of source repositories, names of binary executable files to be generated, locations at which to store binary executable files, etc.). In some embodiments, an automation server 142 provides an interface (e.g., a network-accessible API) via which users and applications can request server-related information and perform various actions including, e.g., obtaining a list of configured workflows, obtaining configuration information associated with configured workflows, creating new workflows, etc.

In some embodiments, at circle "4," the modernization agent 130 optionally uploads application profile data 118 including identifiers of the discovered software applications in the user's computing environment 132. The assessment service 124 may use the uploaded application profile data, for example, to create a software application list that associates the identified software applications with a user account used by the user 104. The software application list, for example, may be displayed to a user in a GUI or other interface to provide a user with information about the discovered set of applications in the user's computing environment 132. In other embodiments, the application profile data is stored only locally by the modernization agent 130.

In some embodiments, at circle "5," either an assessment service 124 or modernization agent 130 initiates processes, at circles "6A" and "6B," to analyze a software application identified by the modernization agent 130 to identify sub-units of the software application, e.g., as part of a process aimed at decomposing a monolithic software application. For example, in some embodiments, the software modernization service 102 or modernization agent 130 receives a request to identify a plurality of subunits of a software application, where each subunit of the plurality of subunits represents a component of the software application that can be implemented as an independently deployable component of the software application. In some embodiments, responsive to such requests, one or more application analyzer(s) 110 generates one or more application profiling metrics 112, a graph model 116, or both, collectively representing and providing information about the software application being analyzed.

Figure 2:
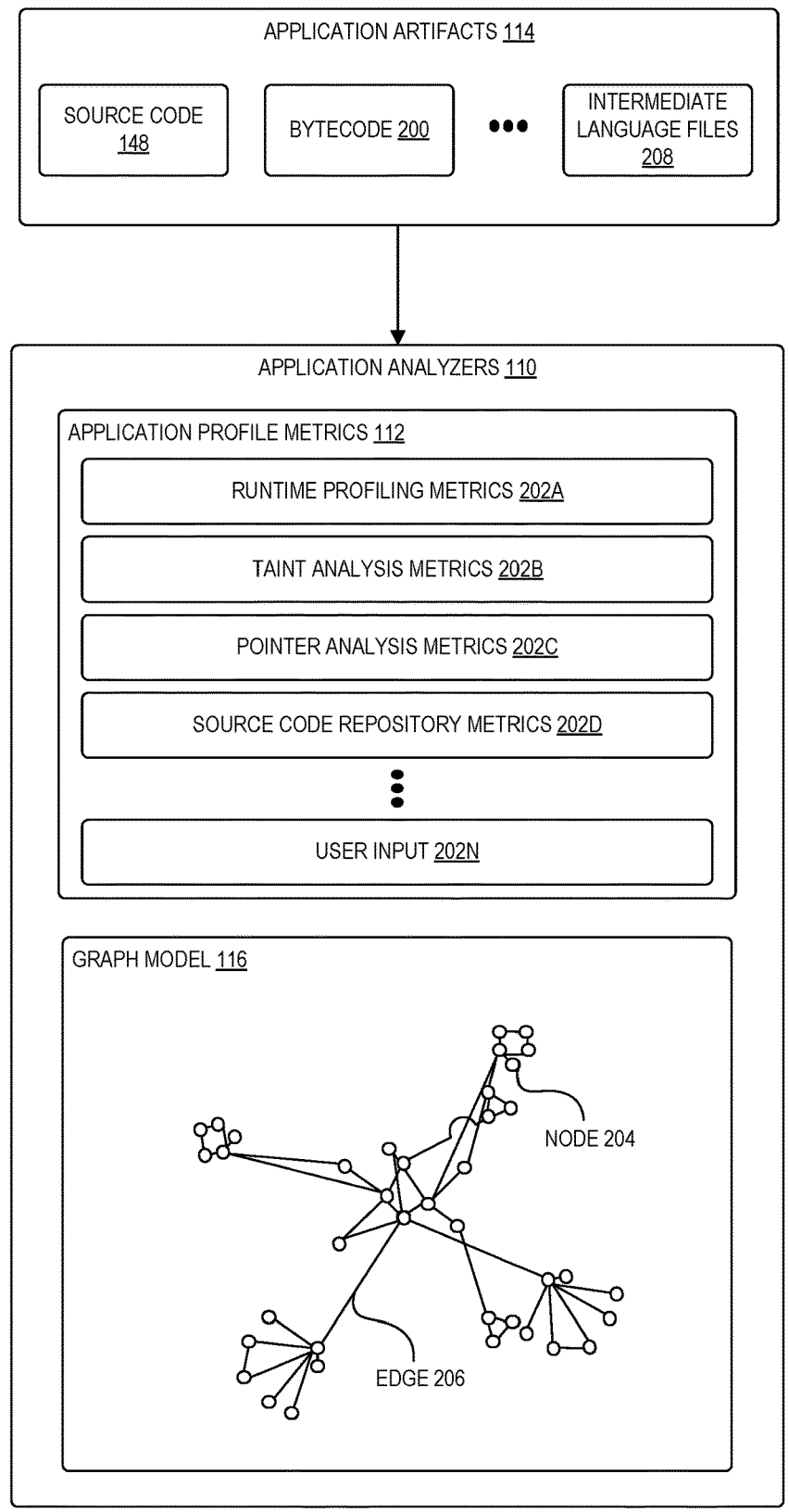
FIG. 2 is a diagram illustrating example application profile metrics generated by one or more application analyzers and the generation of a graph model representation of a monolithic software application according to some embodiments.

FIG. 2 is a diagram illustrating the generation of application profiling metrics and a graph-based model of a software application undergoing modernization processes according to some embodiments. In some embodiments, application artifacts 114, including source code 148, bytecode 200, intermediate language files 208, or combinations thereof, include various application components (e.g., packages, classes, methods, data objects, etc.) that are provided as input to an application analyzer 110 for analysis of component dependencies. These dependencies generally can represent any combination of static source code-derived dependencies (e.g., because on a class referring to another class, or a method in one class referencing a method in a different class), build-time dependencies, and dynamic runtime dependencies.

As indicated, in some embodiments, the application analyzer(s) 110 perform various types of analyses on the software application to obtain any number of separate application profiling metrics 112. These application profiling metrics 112 can include at least one of: runtime profiling metrics 202A representative of at least one of: a cardinality of program calls between application components, a latency of program calls between application components, or resources used to process program calls between application components; taint analysis metrics 202B representative of sources of user input into the software application and associated data flows through the software application; pointer analysis metrics 202C representative of application components that refer to a same shared object in memory; dynamic reference metrics representative of application components that refer to a same runtime instance of a data object; source code repository metrics 202D representative of information associated with source code file statistics relative a version control system (e.g., indicating a frequency of updates to particular files, instances of files being checked into contemporaneously, etc.); or user input 202N specifying information about particular application component dependencies. In some embodiments, the application profiling metrics 112 can be associated with varying types of application abstractions and components, e.g., package, file, class, method, or data object-associated metrics.

In some embodiments, an application analyzer 110 also generates a graph model representing identified dependency relationships among the application components. As shown, the graph model includes a plurality of nodes (e.g., node 204) each representing an application component of the application components (e.g., a package, class, method, data object, etc.) and edges (e.g., edge 206) each representing a dependency relationship between two application components (e.g., indicating that at least one of the application components is dependent on the other component). In some embodiments, a web-based console or standalone application GUI can display a graphical representation of the graph model 116.

Figure 3:
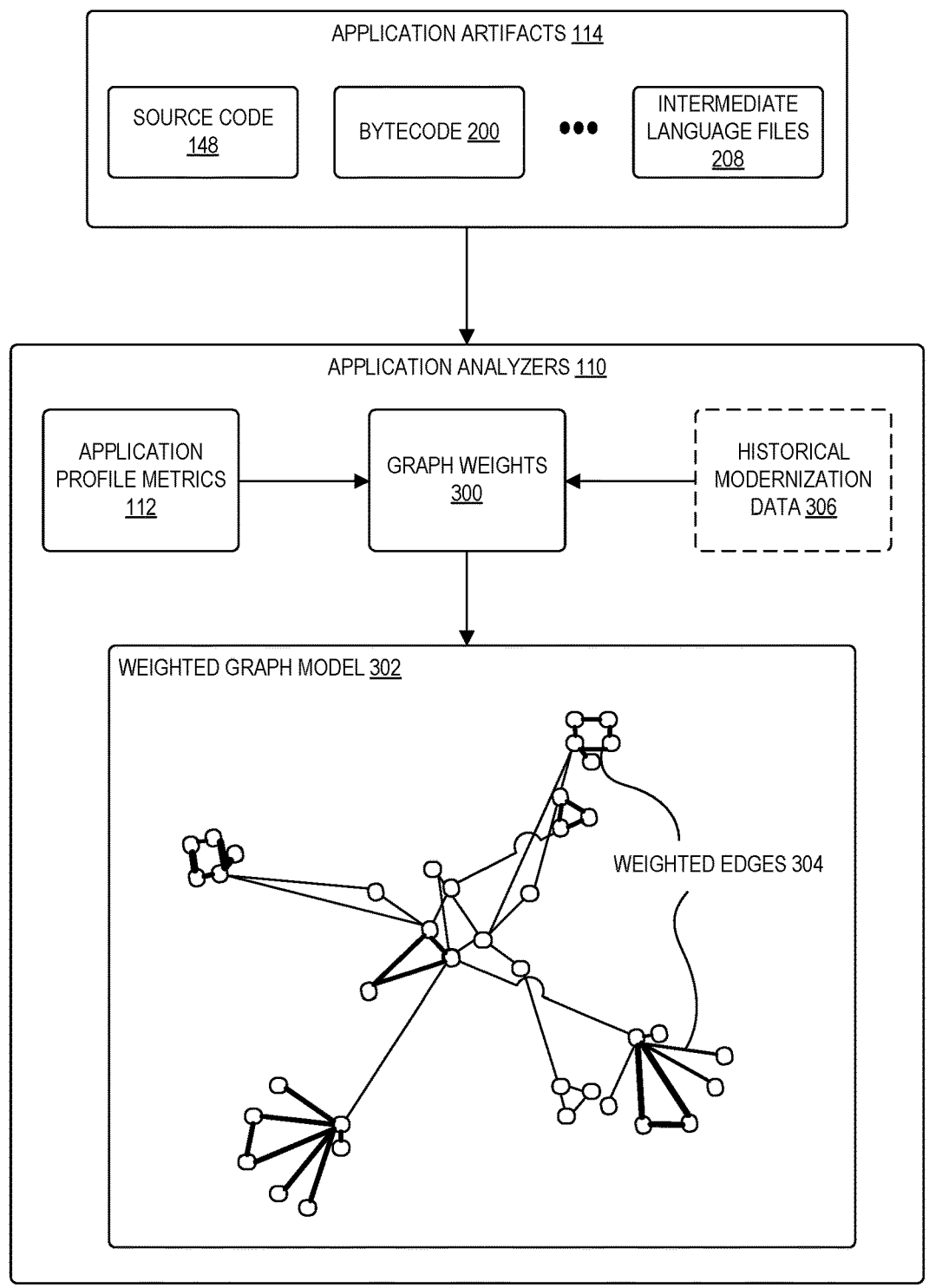
FIG. 3 is a diagram illustrating the application of weights derived from application profile metrics to a graph model to obtain a weighted graph model representation of a monolithic software application according to some embodiments.

In some embodiments, the application profiling metrics 112 generated by the application analyzer(s) 110 are applied to a graph model 116 to obtain a weighted graph model providing more information about the dependency links represented in the graph. FIG. 3 is a diagram illustrating the application of graph weights derived from application profiling metrics to obtain a weighted graph according to some embodiments.

As shown in FIG. 3, an application analyzer 110 uses some or all of the generated application profiling metrics 112 to generate a set of graph weights 300. In some embodiments, the graph weights represent a normalized representation of the application profiling metrics 112 for some or all of the edges in a graph model 116. For example, one edge in the graph might represent a dependency relationship identified between two particular classes used to implement a software application. An application analyzer 110 can generate a weight for the edge by normalizing a plurality of values contained in the application profiling metrics 112 associated with the relationship between the two classes (e.g., runtime profiling metrics, taint analysis metrics, pointer analysis metrics, etc.) and aggregating the normalized value to obtain a weight value for the edge. The collection of graph weights 300 can thus contain a set of weights associated with some or all of the edges in a graph model when, once applied to a graph model 116, result in weighted edges 304 and a weighted graph model 302. In some embodiments, a weighted graph model 302 may be displayed in a GUI with an indication of a weight applied to one or more of the edges, e.g., by using line weighting, display of weight values associated with each edge, or using other visualizations.

The aggregation of values associated with the various application profiling metrics 112 as described above assumes an equal weighting of the various metrics. In some embodiments, a weight or relative prioritization can be applied to one or more of the metrics when generating aggregated weight values for edges of the graph. For example, a user may provide input indicating a relative importance to the user of one or more metrics when refactoring applications and, in response, an application analyzer 110 can generate edge weights based on a weighted aggregation of the application profiling metrics. For example, a user might specify that runtime profiling metrics 202A are weighted more heavily than pointer analysis metrics 202C, while source code repository metrics 202D are weighted more heavily than taint analysis metrics 202B, and so forth. In some embodiments, a user can specify a relative weighting of the application profile metrics, e.g., using a graphical interface and interface components (e.g., slider bars, buttons, etc.) to indicate the desired weightings.

In some embodiments, an application modernization system learns weights for application profiling metrics 112 over time based on monitoring users' refactoring processes. For example, the system can generate refactoring recommendations and subsequently analyze user revisions to the associated application. An analysis of a refactored software application can be used to identify boundaries of the application that were used to decompose the application, and the application profiling metrics associated with those boundaries can be analyzed to identify metrics most relevant to those boundary edges. In some embodiments, this information can be used to automatically generate a set of recommended weights for the metrics for application to generated graph models (e.g., by using historical modernization data 306 as input to the weighting determination process). In some embodiments, regression analysis and other techniques can be used to learn weightings applied by various users for particular types of applications over time to determine an initial set of weightings.

Figure 4:
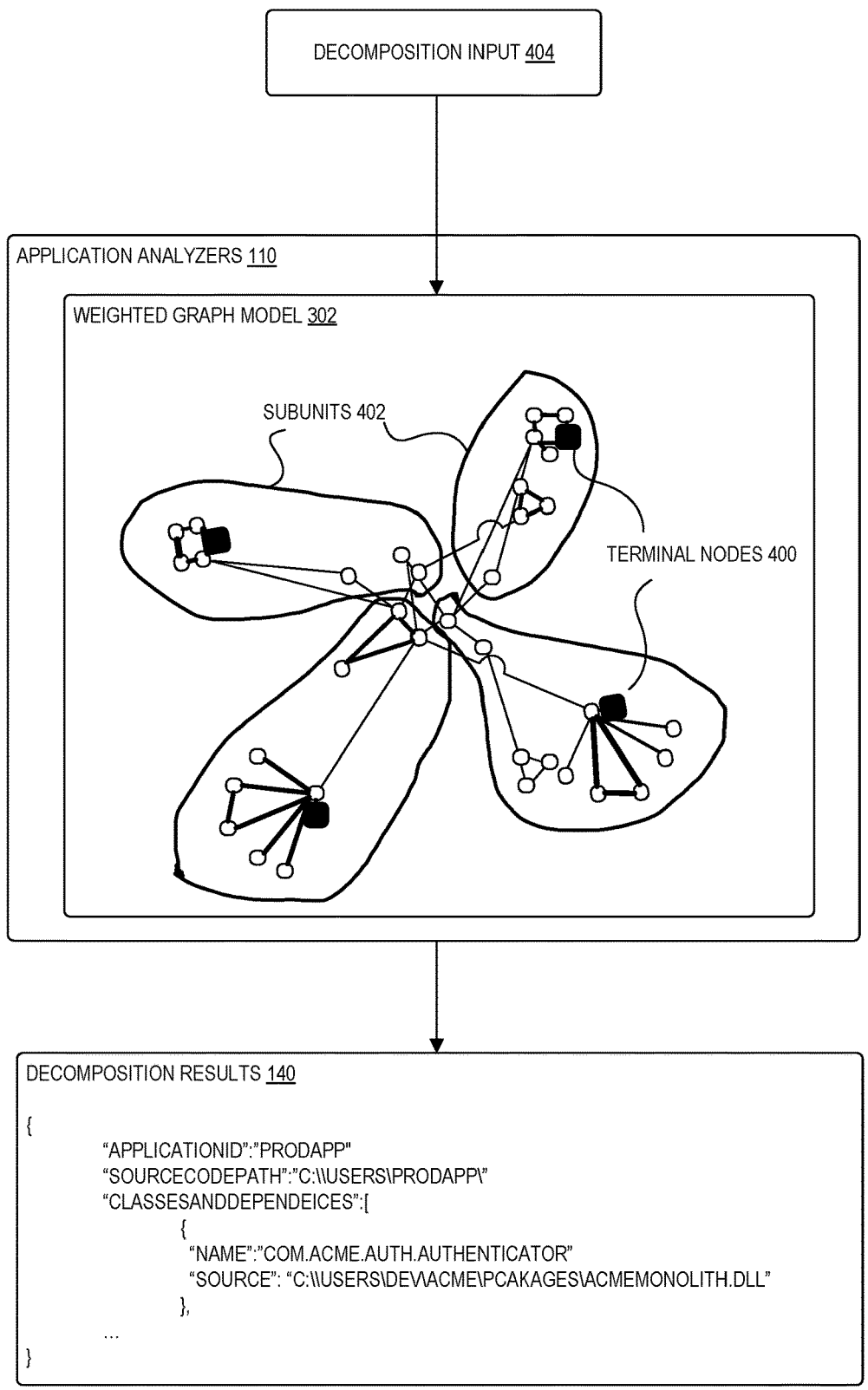
FIG. 4 is a diagram illustrating the identification of application subunits using a weighted graph model and identified terminal nodes as input to a multiterminal cut algorithm according to some embodiments.

In some embodiments, to facilitate the use of various graph partitioning techniques, two or more of the nodes of a weighted graph model 302 are identified as terminal nodes, and the terminal nodes and weighted graph are provided as input to a graph portioning algorithm to identify a set of subgraphs. The terminal nodes, for example, may generally represent entry points into the application (e.g., interface entry points) or other prominent application features. FIG. 4 illustrates the use of a terminal cut algorithm to a weighted graph to obtain an identification of proposed application subunits according to some embodiments. As shown in FIG. 4, an application analyzer 110 identifies a plurality of subunits 402 based on the use of a graph portioning algorithm (e.g., a multiterminal cut algorithm) using a weighted graph model 302 and identified terminal nodes 400 as decomposition input 404, where each subunit 402 includes one of the identified terminal nodes. A multiterminal cut algorithm generally takes as input an edge-weighted graph and an identified set of terminal nodes and identifies a minimum weight set of edges that separates each terminal from all others. In some embodiments, the terminal nodes 400 may be automatically identified by an application analyzer 110 (e.g., based on analyzing configuration files, code annotations, or other data that identifies an application's entry points), based on input from a user identifying the terminal nodes 400, or combinations thereof.

In some embodiments, other types of decomposition input 404 can be used in conjunction with other types of graph partitioning techniques. For example, the decomposition input 404 can include one or more of: a desired number of subunits into which the application is to be segmented, a desired weighting for each subunit of the application (e.g., an aggregate sum of the edge weights for each subunit), and the like. In these examples, other types of graph partitioning techniques can be used to identify an appropriate number of subunits based on the particular type of decomposition input 404 provided.

In some embodiments, the identified set of subunits 402 represent refactoring candidates for decomposing the associated software application into a plurality of independently deployable applications. In some embodiments, information about the identified refactoring candidates can be stored as decomposition results 140, e.g., in a file, database, or other type of data store. For example, the decomposition results 140 may be stored as machine-readable data that can be used by other modernization services or tools, e.g., to display information about the proposed refactoring candidates or to automatically perform various refactoring operations.

In some embodiments, at circle "7" in FIG. 1, application analyzer 110 generates the decomposition results 140 based on the generated and analyzed graph model 116. As indicated above, in some embodiments, the decomposition results 140 may be stored as machine-readable data that can be used by other modernization services or tools, e.g., to display information about the proposed refactoring candidates or to automatically perform various refactoring operations. The results information can include an identification of the identified subunits of the application, information about each of the subunits (e.g., derived from associated metrics or other information), refactoring suggestions, among other possible information. In some embodiments, the decomposition results 140 can be used to generate various GUIs displayed to a user via a modernization agent 130, application modernization service 102, or both.

In some embodiments, binary-augmented refactoring processes can be used to help users automatically refactor software applications based on identified subunits. For example, an analysis of only the source code associated with an application might miss various build-time components and other components associated with frameworks or third-party tools. A framework or third-party tool, for example, might perform code generation or modify the code based on annotations at build time that are not directly evident in the source code. In some embodiments, an application modernization service 102 performs a two-phase application analysis process, including an analysis of the source code and an analysis of associated bytecode or other artifacts to determine how to refactor an application's implementation based on a recommended application decomposition. In some embodiments, an application modernization service 102 then reconciles or merges graphs generated by the various analyses by identifying common nodes and unique nodes and overlaying the graphs on one another. The resulting hybrid model, for example, identifies relationships identified using both analysis processes and can provide a more complete representation of an application for automatic refactoring purposes.

Figure 5:
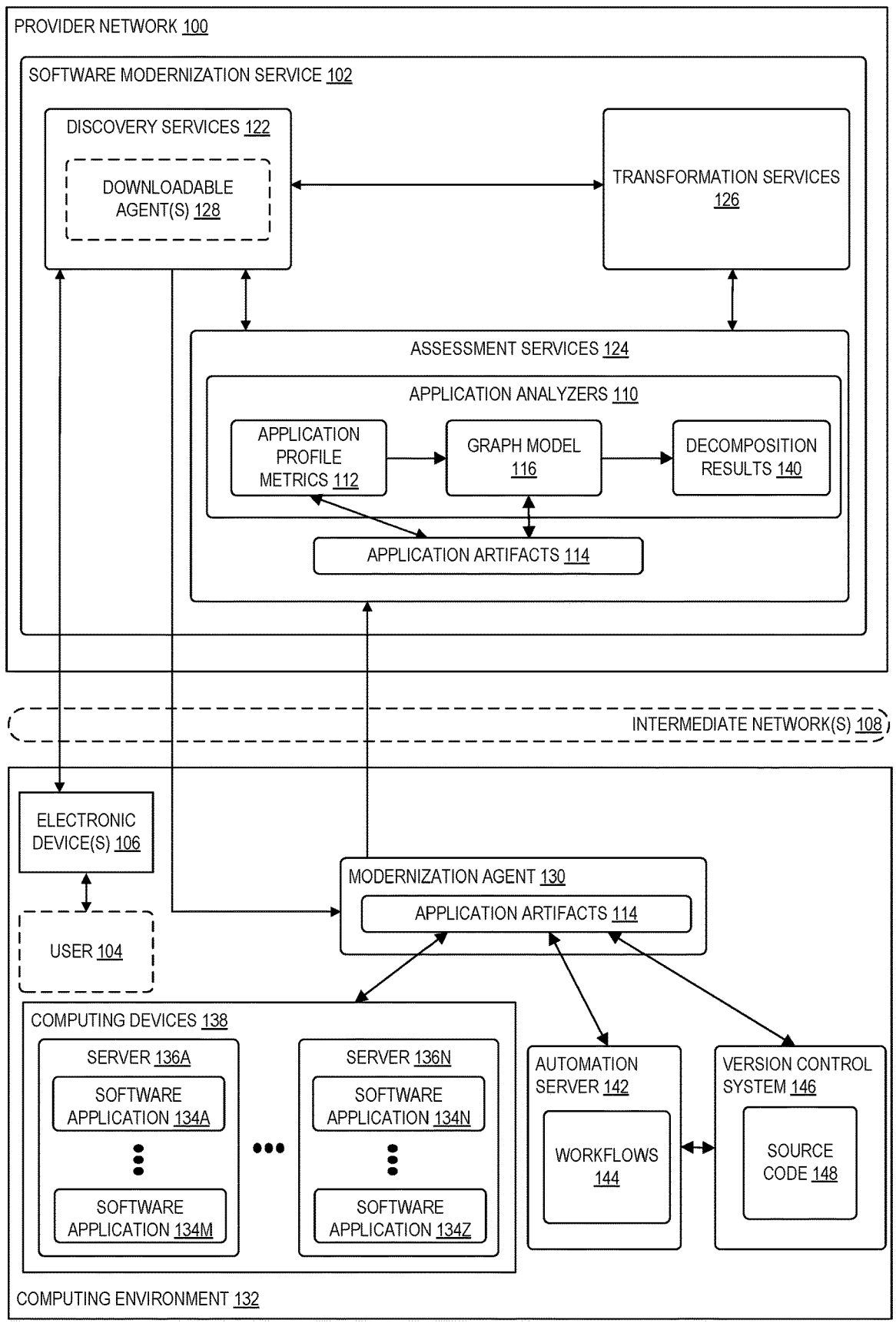
FIG. 5 is a diagram illustrating a service-oriented environment for using graph partitioning techniques to identify refactoring candidates used to decompose monolithic software applications according to some embodiments.

FIG. 5 is a diagram illustrating a service-oriented environment for using graph partitioning techniques to identify refactoring candidates used to decompose monolithic software applications. Compared to the environment illustrated in FIG. 1, for example, the application analyzers 110 are provided as services of an assessment service 124 of the cloud provider network 100. In this example, a modernization agent 130 can be used to collect application artifacts 114 and upload the artifacts to the assessment service 124. In some embodiments, the assessment service 124 can then perform some or all of the application profile metrics 112, graph model 116, and decomposition results 140 processes using computing resources (e.g., computing resources, database resources, etc.) of the cloud provider network 100, thereby taking advantage of the performance and scalability of a cloud provider network.

Figure 6:
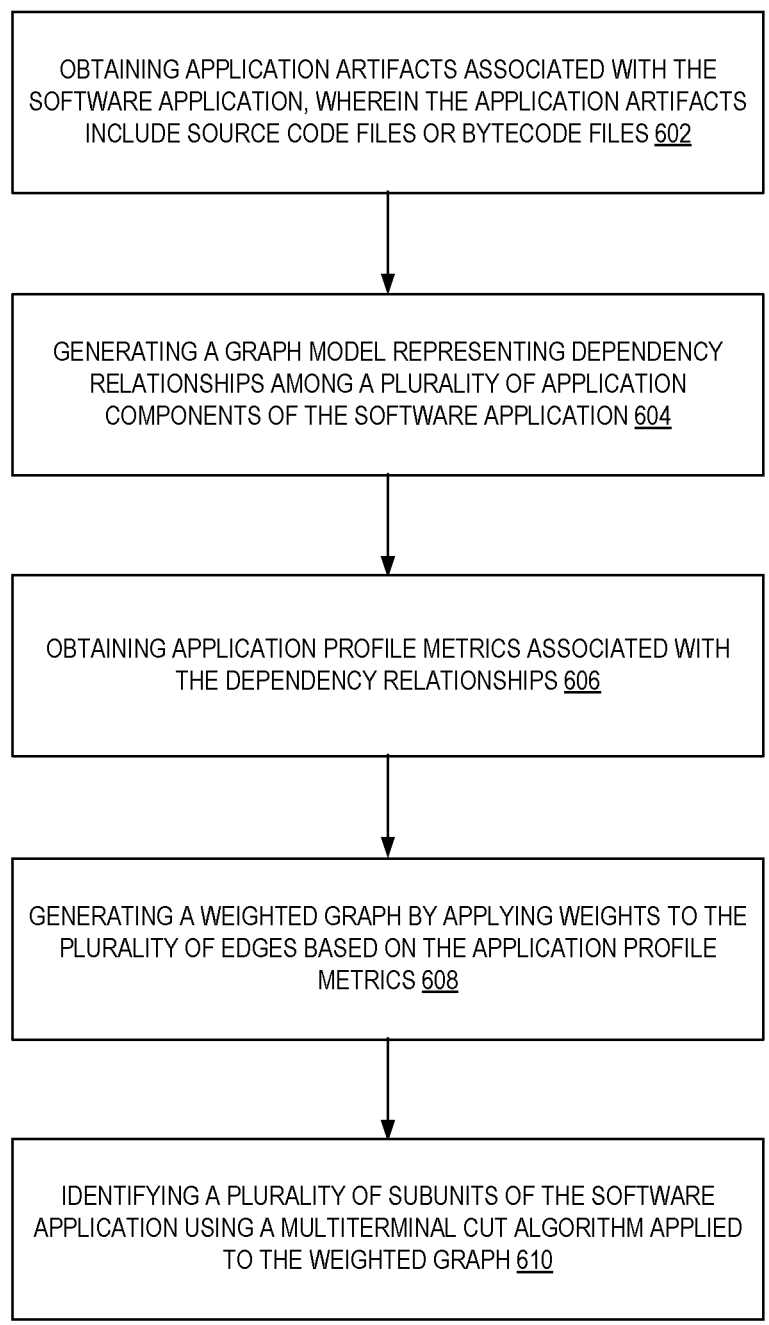
FIG. 6 is a flow diagram illustrating operations of a method for using graph partitioning techniques to identify refactoring candidates used to decompose monolithic software applications as part of software modernization processes according to some embodiments.

FIG. 6 is a flow diagram illustrating operations 600 of a method for using graph partitioning techniques to identify refactoring candidates used to decompose monolithic software applications as part of software modernization processes according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a software modernization system of the other figures.

The operations 600 include, at block 602, obtaining application artifacts associated with the software application, wherein the application artifacts include source code files or bytecode files.

The operations 600 further include, at block 604, generating a graph model representing dependency relationships among a plurality of application components of the software application.

The operations 600 further include, at block 606, obtaining application profile metrics associated with the dependency relationships. In some embodiments, the application profile metrics include at least one of: a runtime profiling metric representative of at least one of: a cardinality of program calls between application components, a latency of program calls between application components, or resources used to process program calls between application components; a taint analysis metric representative of sources of user input into the software application and associated data flows through the software application; a pointer analysis metric representative of application components that refer to a same shared object in memory; a dynamic reference metric representative of application component that refer to a same runtime instance of a data object; or a source code repository metric representative of information associated with source code files relationship with a version control system.

The operations 600 further include, at block 608, generating a weighted graph by applying weights to the plurality of edges based on the application profile metrics.

The operations 600 further include, at block 610, identifying a plurality of subunits of the software application using a multiterminal cut algorithm applied to the weighted graph.

In some embodiments, the operations further include identifying a plurality of terminal nodes from the plurality of nodes, wherein a terminal node of the plurality of terminal nodes represents an entry point into the software application; and identifying the plurality of subunits of the software application using a multiterminal cut algorithm applied to the weighted graph based on the plurality of the terminal nodes.

In some embodiments, the operations further include generating a weight for an edge of the graph model by aggregating each of the application profile metrics for the edge, wherein each of the application profile metrics is associated with a prioritization weight relative to the other application profile metrics.

In some embodiments, the operations further include receiving input indicating a prioritization of at least one of the application profile metrics; generating a respective prioritization weight for each of the application profile metrics based on the input; and generating a weight for an edge of the graph by aggregating each of the application profile metrics according to the respective prioritization weight for each application profile metric.

In some embodiments, the operations further include receiving input identifying a terminal node of the graph model, wherein the terminal node represents an entry point into the software application; and wherein identifying the plurality of subunits of the software application using the graph partitioning algorithm is based at least in part on the terminal node.

In some embodiments, the operations further include receiving input identifying a number of subunits into which the software application is to be partitioned; and wherein identifying the plurality of subunits of the software application using the graph partitioning algorithm is based at least in part on the number of subunits.

In some embodiments, the operations further include generating a modernization report including data identifying the plurality of subunits of the software application.

In some embodiments, the operations further include determining, based on the plurality of subunits, a recommended software application architecture for the software application; and causing display of a graphical user interface (GUI) including an indication of the recommended software application architecture and a representation of resources provided by a cloud provider network to be used to implement the software application based on the recommended software application architecture.

In some embodiments, the graph model represents dependency relationships among classes associated with the software application, and wherein each of the application profile metrics associated with the dependency relationships relates to relationships among one or more of: packages, files, classes, methods, or data objects.

In some embodiments, the operations further include receiving, by a modernization service of a cloud provider network, a request to identify a plurality of subunits of the software application; and sending, to a modernization agent located in a user computing environment, instructions to analyze the software application, wherein the instructions cause the modernization agent to perform at least one of:

obtaining the application artifacts associated with the software application, generating the graph model, obtaining the application profile metrics, generating the weighted graph, or identifying the plurality of subunits of the software application.

In some embodiments, the application artifacts are obtained by a modernization service of a cloud provider network, and wherein computing resources provisioned by the cloud provider network perform at least one of: generating the graph model, obtaining the application profile metrics, generating the weighted graph, or identifying the plurality of subunits of the software application.

In some embodiments, the application artifacts include source code and bytecode, and wherein the operations further include: generating, based on an analysis of the source code, a first graph model representing first dependency relationships among the plurality of application components; generating, based on an analysis of the bytecode, a second graph model representing second dependency relationships among the plurality of application components; and obtaining the graph model in part by merging the first graph model and the second graph model.

Figure 7:
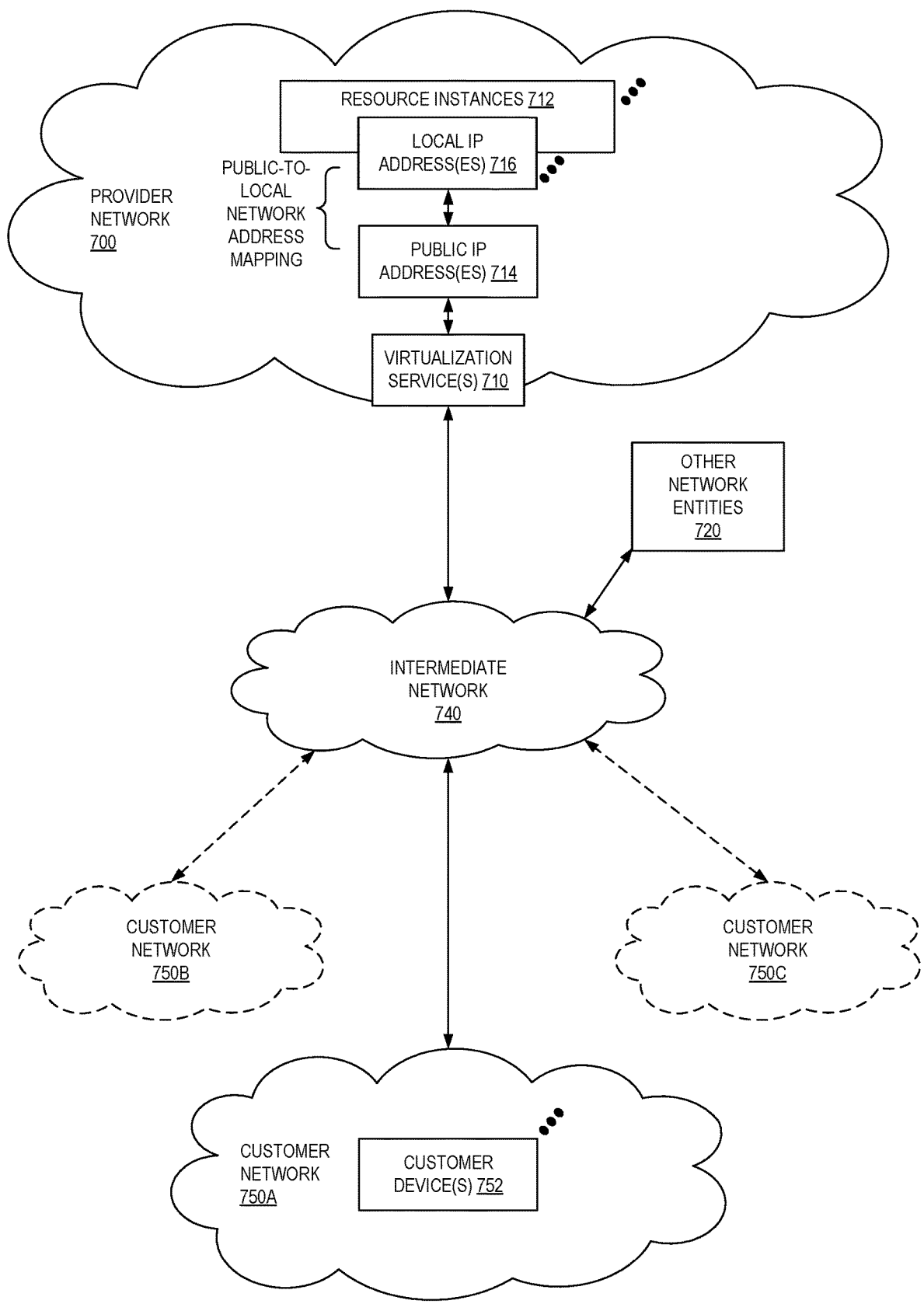
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
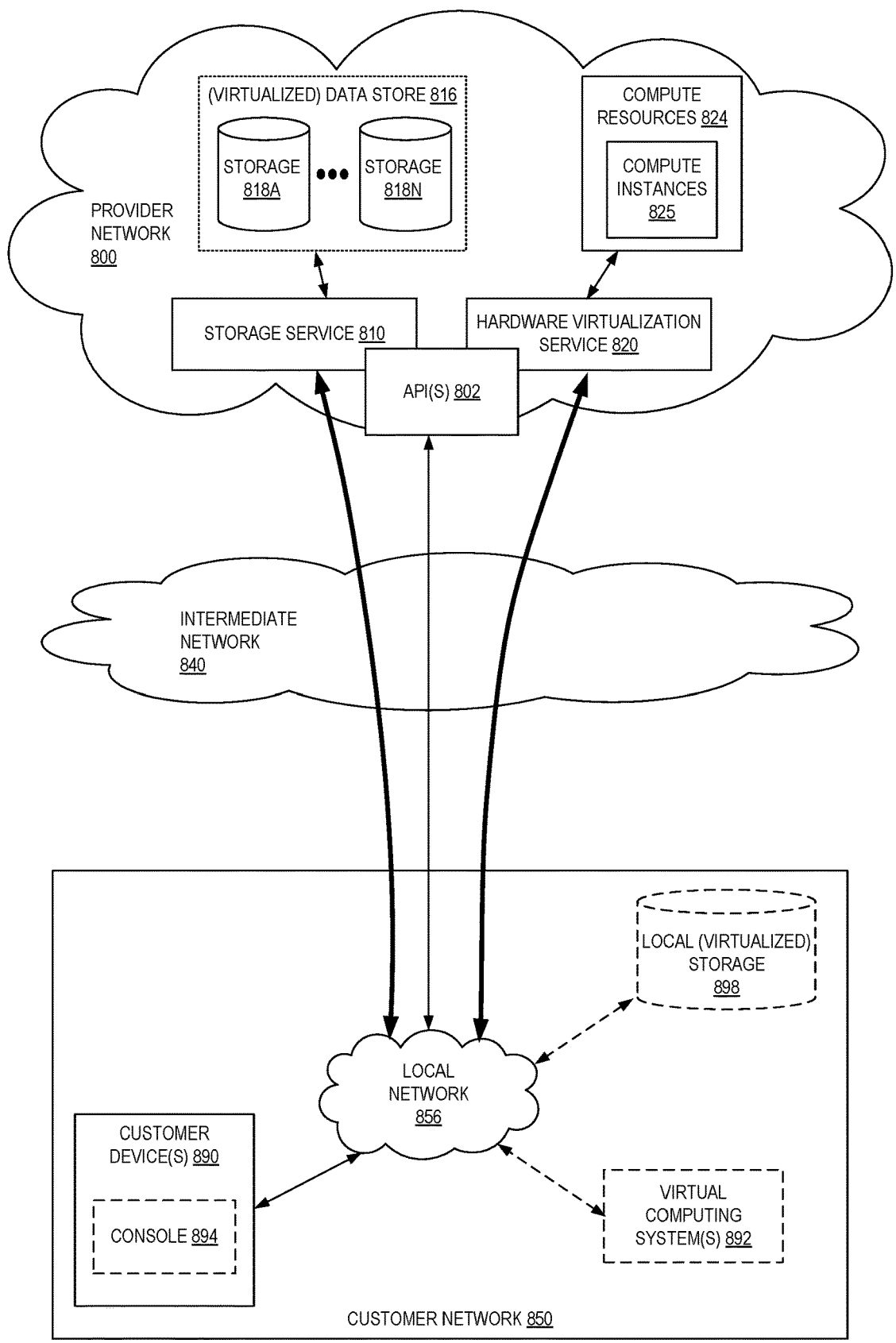
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
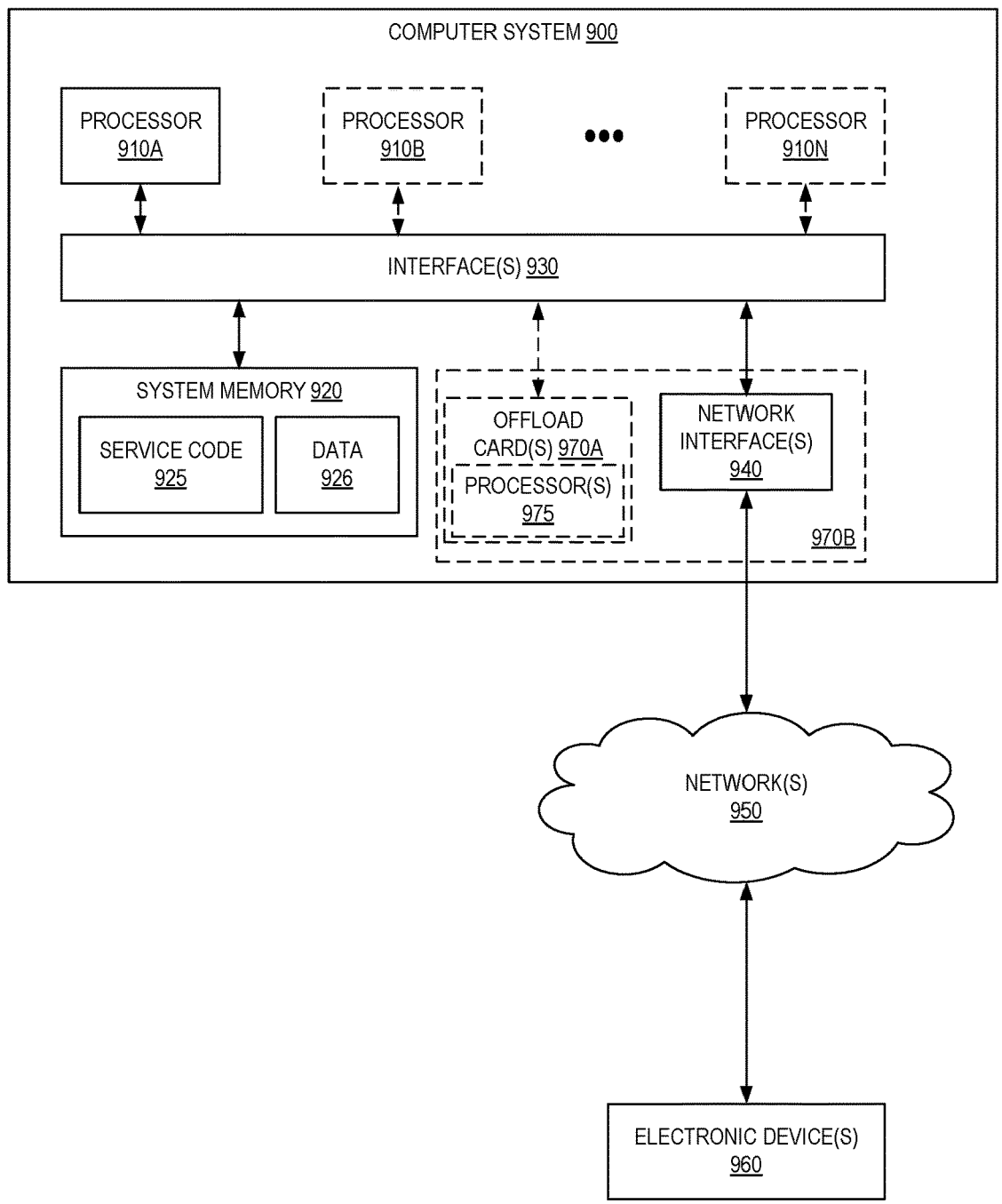
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as service code 925 (e.g., executable to implement, in whole or in part, the software modernization service 102) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, by a software modernization service of a cloud provider network, a request to identify a plurality of subunits of a software application, wherein each subunit of the plurality of subunits represents a component of the software application that can be implemented as an independently deployable component of the software application;
    obtaining application artifacts associated with the software application, wherein the application artifacts include source code files, bytecode files, or intermediate language files;
    generating a graph model representing dependency relationships among a plurality of application components of the application artifacts, wherein the graph model includes:
        a plurality of nodes each representing an application component of the plurality of application components, and
        a plurality of edges each representing a dependency relationship between two application components of the plurality of application components;
    obtaining application profile metrics associated with the dependency relationships;
    generating a weighted graph by applying weights to the plurality of edges based on the application profile metrics;
    identifying the plurality of subunits of the software application by partitioning the weighted graph; and
    causing display of modernization report including data identifying the plurality of subunits of the software application.

2. The computer-implemented method of claim 1, wherein the application profile metrics include at least one of:
    a runtime profiling metric representative of at least one of: a cardinality of program calls between application components, a latency of program calls between application components, or resources used to process program calls between application components;
    a taint analysis metric representative of sources of user input into the software application and associated data flows through the software application;
    a pointer analysis metric representative of application components that refer to a same shared object in memory;
    a dynamic reference metric representative of application components that refer to a same runtime instance of a data object; or
    a source code repository metric representative of information associated with source code file statistics relative to a version control system.

3. The computer-implemented method of claim 1, further comprising:
    identifying a plurality of terminal nodes from the plurality of nodes, wherein a terminal node of the plurality of terminal nodes represents an entry point into the software application; and identifying the plurality of subunits of the software application using a multiterminal cut algorithm applied to the weighted graph based on the plurality of the terminal nodes.

4. A computer-implemented method comprising:
obtaining, by a software modernization service of a cloud provider network, application artifacts associated with a software application, wherein the application artifacts include source code files, bytecode files, or intermediate language files;
generating a graph model representing dependency relationships among a plurality of application components of the application artifacts;
obtaining application profile metrics associated with the dependency relationships;
generating a weighted graph by applying weights to a plurality of edges of the graph model based on the application profile metrics; and
identifying a plurality of subunits of the software application by partitioning the weighted graph; and
causing display of a modernization report including data identifying the plurality of subunits of the software application.

5. The computer-implemented method of claim 4, wherein the application profile metrics include at least one of:
a runtime profiling metric representative of at least one of: a cardinality of program calls between application components, a latency of program calls between application components, or resources used to process program calls between application components;
a taint analysis metric representative of sources of user input into the software application and associated data flows through the software application;
a pointer analysis metric representative of application components that refer to a same shared object in memory;
a dynamic reference metric representative of application component that refer to a same runtime instance of a data object; or
a source code repository metric representative of information associated with source code files relationship with a version control system.

6. The computer-implemented method of claim 4, further comprising:
identifying a plurality of terminal nodes from a plurality of nodes of the graph model, wherein a terminal node of the plurality of terminal nodes represents an entry point into the software application; and
identifying the plurality of subunits of the software application using a multiterminal cut algorithm applied to the weighted graph based on the plurality of the terminal nodes.

7. The computer-implemented method of claim 4, further comprising generating a weight for an edge of the graph model by aggregating each of the application profile metrics for the edge, wherein each of the application profile metrics is associated with a prioritization weight relative to the other application profile metrics.

8. The computer-implemented method of claim 4, further comprising:
receiving input indicating a prioritization of at least one of the application profile metrics;
generating a respective prioritization weight for each of the application profile metrics based on the input; and
generating a weight for an edge of the graph model by aggregating each of the application profile metrics according to the respective prioritization weight for each application profile metric.

9. The computer-implemented method of claim 4, further comprising:
receiving input identifying a terminal node of the graph model, wherein the terminal node represents an entry point into the software application; and
wherein identifying the plurality of subunits of the software application using the graph partitioning algorithm is based at least in part on the terminal node.

10. The computer-implemented method of claim 4, further comprising:
receiving input identifying a number of subunits into which the software application is to be partitioned; and
wherein identifying the plurality of subunits of the software application using the graph partitioning algorithm is based at least in part on the number of subunits.

11. The computer-implemented method of claim 4, further comprising providing data identifying the plurality of subunits of the software application to another service of the cloud provider network.

12. The computer-implemented method of claim 4, further comprising:
determining, based on the plurality of subunits, a recommended software application architecture for the software application; and
causing display of a graphical user interface (GUI) including an indication of the recommended software application architecture and a representation of resources provided by a cloud provider network to be used to implement the software application based on the recommended software application architecture.

13. The computer-implemented method of claim 4, wherein the graph model represents dependency relationships among classes associated with the software application, and wherein each of the application profile metrics associated with the dependency relationships relates to relationships among one or more of: packages, files, classes, methods, or data objects.

14. The computer-implemented method of claim 4, further comprising:
receiving, by the software modernization service of a cloud provider network, a request to identify a plurality of subunits of the software application; and
sending, to a modernization agent located in a user computing environment, instructions to analyze the software application, wherein the instructions cause the modernization agent to perform at least one of: obtaining the application artifacts associated with the software application, generating the graph model, obtaining the application profile metrics, generating the weighted graph, or identifying the plurality of subunits of the software application.

15. The computer-implemented method of claim 4, wherein the application artifacts are obtained by the software modernization service of the cloud provider network, and wherein computing resources provisioned by the cloud provider network perform at least one of: generating the graph model, obtaining the application profile metrics, generating the weighted graph, or identifying the plurality of subunits of the software application.

16. The computer-implemented method of claim 4, wherein the application artifacts include source code and bytecode, and wherein the method further comprises:
generating, based on an analysis of the source code, a first graph model representing first dependency relationships among the plurality of application components;

generating, based on an analysis of the bytecode, a second graph model representing second dependency relationships among the plurality of application components; and obtaining the graph model in part by merging the first graph model and the second graph model.

17. A system comprising:

a first one or more electronic devices to implement a software modernization service in a cloud provider network, wherein the software modernization service includes instructions that upon execution cause the software modernization service to:

obtain application artifacts associated with a software application, wherein the application artifacts include source code files, bytecode files, or intermediate language files, generate a graph model representing dependency relationships among a plurality of application components of the software application, obtain application profile metrics associated with the dependency relationships, generate a weighted graph by applying weights to a plurality of edges of the graph model based on the application profile metrics, identify a plurality of subunits of the software application by partitioning the weighted graph, and causing display of a modernization report including data identifying the plurality of subunits of the software application; and a second one or more electronic devices to implement a modernization agent, wherein the modernization agent including instructions that upon execution cause the modernization agent to:

obtain the application artifacts associated with the software application from a user's computing environment; and send the application artifacts to the software modernization service.

18. The system of claim 17, wherein the application profile metrics include at least one of:

a runtime profiling metric representative of at least one of: a cardinality of program calls between application components, a latency of program calls between application components, or resources used to process program calls between application components;

a taint analysis metric representative of sources of user input into the software application and associated data flows through the software application;

a pointer analysis metric representative of application components that refer to a same shared object in memory;

a dynamic reference metric representative of application component that refer to a same runtime instance of a data object; or a source code repository metric representative of information associated with source code files relationship with a version control system.

19. The system of claim 17, wherein the software modernization service includes further instructions that upon execution cause the software modernization service to:

identify a plurality of terminal nodes from a plurality of nodes of the graph model, wherein a terminal node of the plurality of terminal nodes represents an entry point into the software application; and wherein identifying a plurality of subunits of the software application includes using a multiterminal cut algorithm applied to the weighted graph based on the plurality of the terminal nodes.

20. The system of claim 17, wherein the software modernization service includes further instructions that upon execution cause the software modernization service to generate the weights by aggregating each of the application profile metrics for each edge of the graph model, wherein each of the application profile metrics is associated with a prioritization weight relative to the other application profile metrics.

* * * * *